US008001567B2

(12) United States Patent
Ozer et al.

(10) Patent No.: US 8,001,567 B2
(45) Date of Patent: Aug. 16, 2011

(54) MEDIA PLANNER

(75) Inventors: Stuart Ozer, San Francisco, CA (US); Wei Wei Ada Cho, Mountain View, CA (US); Warren Neal Thornthwaite, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 1491 days.

(21) Appl. No.: 10/137,178

(22) Filed: May 2, 2002

(65) Prior Publication Data

US 2004/0203639 A1    Oct. 14, 2004

(51) Int. Cl.
*H04N 5/445* (2011.01)
*G06F 13/00* (2006.01)
*G06F 3/00* (2006.01)
*H04N 5/76* (2006.01)

(52) U.S. Cl. ............... 725/44; 725/58; 725/61; 386/297; 715/700

(58) Field of Classification Search .................... 725/44, 725/45, 46, 47, 58, 61; 455/414; 386/297; 715/700, 968
See application file for complete search history.

(56) References Cited

U.S. PATENT DOCUMENTS

| 5,589,892 | A  | * | 12/1996 | Knee et al. ...................... 725/43 |
| 5,758,259 | A  |   | 5/1998  | Lawler |
| 5,815,145 | A  | * | 9/1998  | Matthews, III ................. 725/41 |
| 5,907,323 | A  |   | 5/1999  | Lawler et al. |
| 6,041,311 | A  |   | 3/2000  | Chislenko et al. |
| 6,049,777 | A  |   | 4/2000  | Sheena et al. |
| 6,078,348 | A  | * | 6/2000  | Klosterman et al. ............ 725/40 |
| 6,092,049 | A  |   | 7/2000  | Chislenko et al. |
| 6,112,186 | A  |   | 8/2000  | Bergh et al. |
| 6,463,428 | B1 | * | 10/2002 | Lee et al. .......................... 707/3 |
| 6,483,548 | B1 | * | 11/2002 | Allport ......................... 348/564 |
| 6,906,733 | B1 | * | 6/2005  | Sullivan ........................ 715/700 |
| 7,051,280 | B1 | * | 5/2006  | Ko ................................ 715/718 |
| 2001/0016945 | A1 | * | 8/2001 | Inoue .............................. 725/44 |
| 2002/0011988 | A1 | * | 1/2002 | Sai et al. ....................... 345/156 |
| 2002/0040475 | A1 | * | 4/2002 | Yap et al. ........................ 725/39 |
| 2002/0100046 | A1 | * | 7/2002 | Dudkiewicz ................... 725/46 |
| 2002/0120925 | A1 | * | 8/2002 | Logan ............................. 725/9 |
| 2002/0124256 | A1 | * | 9/2002 | Suzuka .......................... 725/55 |

FOREIGN PATENT DOCUMENTS

| JP | 2002-112141 | * | 4/2002 |
| JP | 2002-044554 | * | 8/2002 |
| JP | 2002-112141 | * | 12/2002 |
| WO | WO9222983 | * | 12/1992 |

* cited by examiner

*Primary Examiner* — Hoang-Vu A Nguyen-Ba
(74) *Attorney, Agent, or Firm* — Lee & Hayes, PLLC

(57) ABSTRACT

A media planner displays descriptors that represent programs that are scheduled for broadcast on tiles according to a layout. The layout arranges the tiles according to a day and a day part based on a scheduled broadcast date and time associated with a program.

65 Claims, 10 Drawing Sheets

| APRIL 19 | 1:00 PM | 1:30 PM | 2:00 PM | 2:30 PM | 3:00 PM | 3:30 PM |
|---|---|---|---|---|---|---|
| 1 PPV | Shrek | | | Atlantis: The Lost Empire | | |
| 2 KREM | As the World Turns | | Guilding Light | | Ananda Lewis | |
| 3 KAYU | Texas Justice | Paid Programming | Paid Programming | Garfield 108 | Magic Schoolbus | Sister, Sister |
| 4 KXLY | One Life to Live | | General Hospital | 106 | Port Charles | Maury |
| 5 GOVACC | <<Government Access Programming>> | | | | | |
| 6 KHQ | Days of Our Lives | | Passions | | Rosie O'Donnel | |
| 7 KSPS | Terry Madden Watercolor | Kaye's Quilting Friends | Caillou | Sagwa, the Chinese Siamese Cat | Mister Rogers' Neighborhood | Arthur |
| 8 KGPX | Bonanza | | Bonanza | | Promised Land | |
| 9 TDC | Home Matters | | Christopher Lowell | | Christopher Lowell | |
| 10 HSN | Mother's Day Gifts | | Gem Source | | | |
| 11 PIN | Orange Clean | Ultra Oven | Slim Down | Leigh Valentine | Bowflex | Gazelle Freestyle |
| 12 VP-CH | Southside Homes | Northside Homes | | Misc. Properties | Rental Pages | Etcetera |

*Figure 1*
*Prior Art*

| | Favorites — 608 | Sports — 610 | Movies — 612 | | | | |
|---|---|---|---|---|---|---|---|
| DAY PART | MONDAY | TUESDAY | WEDNESDAY | THURSDAY | FRIDAY | SATURDAY | SUNDAY |
| MORNING (6:00 AM TO 10:59 AM) | 602(1) | 602(2) | | | | | |
| DAY PART | MONDAY | TUESDAY | WEDNESDAY | THURSDAY | FRIDAY | SATURDAY | SUNDAY |
| EARLY AFTERNOON (11:00 AM TO 3:59 PM) | 602(3) | 602(4) | | | | | |
| DAY PART | MONDAY | TUESDAY | WEDNESDAY | THURSDAY | FRIDAY | SATURDAY | SUNDAY |
| EVENING (4:00 PM TO 6:59 PM) | | | | | | | |
| DAY PART | MONDAY | TUESDAY | WEDNESDAY | THURSDAY | FRIDAY | SATURDAY | SUNDAY |
| PRIME TIME (7:00 PM TO 10:59 PM) | | | | | | | |
| DAY PART | MONDAY | TUESDAY | WEDNESDAY | THURSDAY | FRIDAY | SATURDAY | SUNDAY |
| LATE NIGHT (11:00 PM TO 5:59 AM) | | | | | | | 602(N) |

| DAY PART | MONDAY | TUESDAY | WEDNESDAY | THURSDAY | FRIDAY | SATURDAY | SUNDAY |
|---|---|---|---|---|---|---|---|
| 708 → | Anthony Ant [P] | Anthony Ant [P] | Anthony Ant [P] | Anthony Ant [P] | Anthony Ant [P] | Dude, Where's My Car? [P][R] | HBO Storybook Musicals [P][R] |
| 702 → | Kindergarten [P] | Harold and the Purple Crayon [P] | Any Given Sunday [P] | Dude, Where's My Car? [P][R] | Harold and the Purple Crayon [P] | Harold and the Purple Crayon [P] | Kindergarten [P] |
|  | BBC World News [P] | Family Fued [P][R] | Kindergarten [P][R] | BBC World News [P] | BBC World News [P] | HBO Storybook Musicals [P] | Arthur [P][R] |
|  | The View [P][R] | The People's Court [P][R] | Family Fued [P][R] | The View [P][R] | The View [P][R] | Golf [P][R] | NFL Countdown [P][R] |
|  | The Price Is Right [P][R] | Jenny Jones [P][R] | The People's Court [P][R] | The Price Is Right [P][R] | The Price Is Right [P][R] | The Neverending Story [P] | Hollywood Squares [P][R] |
|  | Jenny Jones [P][R] | The Price Is Right [P][R] | Jenny Jones [P][R] | Jenny Jones [P][R] | Jenny Jones [P][R] | Arthur [P][R] | Dragon Tales [P] |
| MORNING (6:00 AM TO 10:59 AM) | Good Morning America [P][R] | The Early Show [P][R] | The Price Is Right [P][R] | Good Morning America [P][R] | Good Morning America [P][R] | NiNi's Treehouse [P][R] | KRON 4 News Weekend [P][R] |
|  | Live With Regis and Kelly [P][R] | Martha Stewart Living [P][R] | The Early Show [P][R] | Live With Regis and Kelly [P][R] | Live With Regis and Kelly [P][R] | Hollywood Squares [P][R] | Wheel of Fortune [P][R] |
|  | Martha Stewart Living [P][R] | The View [P] | Martha Stewart Living [P][R] | Martha Stewart Living [P][R] | Martha Stewart Living [P][R] | KRON 4 News Weekend [P][R] | Little Lulu [P] |
|  | Little Lulu [P] | Live With Regis and Kelly [P] | The View [P][R] | Little Lulu [P] | Little Lulu [P] | Wheel of Fortune [P][R] |  |
|  | 602(1) | The Other Half [P][R] | Live With Regis and Kelly [P][R] |  | 704 | Little Lulu [P] |  |
|  |  | Good Morning America [P][R] | The Other Half [P][R] |  | 706 |  |  |
|  |  |  | Good Morning America |  |  |  |  |

| DAY PART | MONDAY | TUESDAY | WEDNESDAY | THURSDAY | FRIDAY | SATURDAY | SUNDAY |
|---|---|---|---|---|---|---|---|
|  | A Little Curious [P][R] | A Little Curious [P][R] | A Little Curious [P][R] | A Little Curious [P][R] | A Little Curious [P][R] | A Little Curious [P][R] | A Little Curious [P][R] |
|  | Anthony Ant [P] | Anthony Ant [P] | Anthony Ant [P] | Anthony Ant [P] | Anthony Ant [P] | Any Give Sunday [P] | HBO Storybook Musicals [P][R] |
|  | Judge Joe Brown [P] | Harold and the Purple Crayon [P] | Any Given Sunday [P][R] | Dude, Where's My Car? [P][R] | Harold and the Purple Crayon [P] | Harold and the Purple Crayon [P] | Kindergarten [P][R] |
|  | Kindergarten [P][R] | Judge Joe Brown [P] | Judge Joe Brown [P] | The Wild Thornberrys [P] | Judge Joe Brown [P] | HBO Storybook Musicals [P] | Space Cowboys [P][R] |
| EARLY AFTERNOON (11:00 AM TO 3:59 PM) | Access Hollywood [P][R] | Talking Movies [P][R] | Kindergarten [P][R] | The Weather Channel [P] | The Soccer Show [P][R] | Crashbox [P][R] | Doug [P][R] |
|  | BBC World News [P][R] | BBC World News [P][R] | Access Hollywood [P][R] | Dragon Tales [P][R] | EXTRA [P][R] | Doug [P][R] | George and Martha [P][R] |
|  | EXTRA [P][R] | EXTRA [P][R] | BBC World News [P][R] | Dream Builders [P][R] | Dragon Tales [P][R] | Inside the NFL [P][R] | Golf [P] |
|  | Dragon Tales [P][R] | Dragon Tales [P][R] | EXTRA [P][R] | Crashbox [P][R] | Bay Cafe [P][R] | George and Martha [P][R] | EXTRA [P][R] |
|  | Bay Cafe [P][R] | Bay Cafe [P][R] | Dragon Tales [P][R] | Little Lulu [P][R] | Evening Magazine [P][R] | NHL Hockey [P][R] | Figure Skating [P][R] |

Figure 8

| DAY PART | MONDAY | TUESDAY | WEDNESDAY | THURSDAY | FRIDAY | SATURDAY | SUNDAY |
|---|---|---|---|---|---|---|---|
| MORNING (6:00 AM TO 10:59 AM) | Anthony Ant [P] | Anthony Ant [P] | Anthony Ant [P] | Anthony Ant [P] | Anthony Ant [P] | Dude, Where's My Car? [P] | HBO Storybook Musicals [P] |
| | Kindergarten [P] | Harold and the Purple Crayon [P] | Any Given Sunday [P] | Dude, Where's My Car? [P] | Harold and the Purple Crayon [P] | Harold and the Purple Crayon [P] | Kindergarten [P] |
| | BBC World News [P] | Family Fued [P] | Kindergarten [P] | BBC World News [P] | BBC World News [P] | HBO Storybook Musicals [P] | Arthur [P] |
| | The View [P][R] | The People's Court [P][R] | Family Fued [P][R] | The View [P][R] | The View [P][R] | Golf [P] | NFL Countdown [P][R] |
| | The Price Is Right [P][R] | Jenny Jones [P][R] | The People's Court [P][R] | The Price Is Right [P][R] | The Price Is Right [P][R] | The Neverending Story [P][R] | Hollywood Squares [P][R] |
| | Jenny Jones [P][R] | The Price Is Right [P][R] | Program Info | | | Arthur [P][R] | Dragon Tales [P] |
| | Good Morning America [P][R] | The Early Show [P][R] | Martha Stewart Living | | | NiNi's Treehouse [P][R] | KRON 4 News Weekend [P][R] |
| | Live With Regis and Kelly [P][R] | Martha Stewart Living [P][R] | Friday, April 19 9:00am – 9:30am | | | Hollywood Squares [P][R] | Wheel of Fortune [P][R] |
| | Martha Stewart Living [P][R] | The View [P][R] | 4KXLY | | | KRON 4 News Weekend [P][R] | Little Lulu [P] |
| | Little Lulu [P] | Live With Regis and Kelly [P] | Mai Pham prepares rice rolls filled with mushrooms and shrimp; Marc Morrone discusses macaws. Also: homemade bath salts; jewel orchids. | | | Wheel of Fortune [P] | |
| | | The Other Half [P][R] | | | | Little Lulu [P] — 704 | |
| | | Good Morning America [P][R] | (CLOSE) | | | | |

| DAY PART | MONDAY | TUESDAY | WEDNESDAY | THURSDAY | FRIDAY | SATURDAY | SUNDAY |
|---|---|---|---|---|---|---|---|
| EARLY AFTERNOON (11:00 AM TO 3:59 PM) | A Little Curious [P][R] | A Little Curious [P][R] | A [P][R] | A [P][R] | Curious [P][R] | A Little Curious [P][R] | A Little Curious [P][R] |
| | Anthony Ant [P] | Anthony Ant [P] | A [P][R] | A [P][R] | Ant [P] | Any Give Sunday [P] | HBO Storybook Musicals [P][R] |
| | Judge Joe Brown [P] | Harold and the Purple Crayon [P] | | | nd the rayon [P] | Harold and the Purple Crayon [P] | Kindergarten [P][R] |
| | Kindergarten [P][R] | Judge Joe Brown [P][R] | Judge Joe Brown [P] | The Wild Thornberrys [P] | Judge Joe Brown [P][R] | HBO Storybook Musicals [P][R] | Space Cowboys [P][R] |
| | Access Hollywood [P][R] | Talking Movies [P][R] | Kindergarten [P][R] | The Weather Channel [P] | The Soccer Show [P] | Crashbox [P][R] | Doug [P][R] |
| | BBC World News [P][R] | BBC World News [P][R] | Access Hollywood [P][R] | Dragon Tales [P][R] | EXTRA [P][R] | Doug [P][R] | George and Martha [P][R] |
| | EXTRA [P][R] | EXTRA [P][R] | BBC World News [P][R] | Dream Builders [P][R] | Dragon Tales [P][R] | Inside the NFL [P][R] | Golf [P] |
| | Dragon Tales [P][R] | Dragon Tales [P][R] | EXTRA [P][R] | Crashbox [P][R] | Bay Cafe [P][R] | George and Martha [P][R] | EXTRA [P][R] |
| | Bay Cafe [P][R] | Bay Cafe [P][R] | Dragon Tales [P][R] | Little Lulu [P][R] | Evening Magazine [P][R] | NHL Hockey [P][R] | Figure Skating [P][R] |

| DAY PART | MONDAY | | TUESDAY | | WEDNESDAY | | THURSDAY | | FRIDAY | | SATURDAY | | SUNDAY | |
|---|---|---|---|---|---|---|---|---|---|---|---|---|---|---|
| | Anthony Ant | P | Anthony Ant | P | Anthony Ant | P | Anthony Ant | P | Anthony Ant | P | Dude, Where's My Car? | P|R | HBO Storybook Musicals | P|R |
| | Kindergarten | P | Harold and the Purple Crayo | | Request Confirmation 902 | | | | Harold and the Purple Crayon | P | Kindergarten | P|R | | |
| | BBC World News | P | Family Fued | | The following Remote Record request will be sent to your satelite receiver: | | | | HBO Storybook Musicals | P | Arthur | P|R | | |
| | The View | P|R | The People's | | | | | | Golf | P|R | NFL Countdown | P|R | | |
| | The Price Is Right | P|R | Jenny Jones | | Martha Stewart Living 904 | | | | The Neverending Story | P | Hollywood Squares | P|R | | |
| MORNING (6:00 AM TO 10:59 AM) | Jenny Jones | P|R | The Price Is | | Friday, April 19 9:00am - 9:30am 4KXLY | | | | Arthur | P|R | Dragon Tales | P | | |
| | Good Morning America | P|R | The Early Sh | | | | | | NiNi's Treehouse | P|R | KRON 4 News Weekend | P|R | | |
| | Live With Regis and Kelly | P|R | Martha Stew Living | | Mai Pham prepares rice rolls filled with mushrooms and shrimp; Marc Morrone discusses macaws. Also: homemade bath salts; jewel orchids. | | | | Hollywood Squares | P|R | Wheel of Fortune | P|R | | |
| | Martha Stewart Living | P|R | The View | | | | | | KRON 4 News Weekend | P|R | Little Lulu | P | | |
| | Little Lulu | P | Live With Re and Kelly | | Your recording has been set with these options: 906 | | | | Wheel of Fortune | P|R | | | | |
| | | | The Other H | | -Keep at least 1 day | | | | Little Lulu | P | | | | |
| | | | Good Mornin America | | -End recording when scheduled -If this show conflicts with another, don't record it | | | | | | | | | |
| DAY PART | MONDAY | | TUE | | | | | | | | SATURDAY | | SUNDAY | |
| | A Little Curious | P|R | A Little Curio | | This request will appear in your My Shows list if a satelite connection is available. | | | | | | A Little Curious | P|R | A Little Curious | P|R |
| | Anthony Ant | P|R | Anthony Ant | | | | | | | | Any Give Sunday | P|R | HBO Storybook Musicals | P|R |
| | Judge Joe Brown | P | Harold and th Purple Crayo | | CLOSE | | | | | | Harold and the Purple Crayon | P|R | Kindergarten | P|R |
| | Kindergarten | P|R | Judge Joe Br | | | | | | | | HBO Storybook Musicals | P|R | Space Cowboys | P |
| | Access Hollywood | P|R | Talking Movi | | | | | | | | Crashbox | P|R | Doug | P|R |
| EARLY AFTERNOON (11:00 AM TO 3:59 PM) | BBC World News | P|R | BBC World N | | | | | | | | Doug | P|R | George and Martha | P|R |
| | EXTRA | P|R | EXTRA | | | | | | | | Inside the NFL | P|R | Golf | P |
| | Dragon Tales | P|R | Dragon Tale | | | P|R | Dragon Tales | | P|R | Little Lulu | George and Martha | P|R | EXTRA | P|R |
| | Bay Cafe | P|R | Bay Cafe | | | | | | P|R | Evening Magazine | NHL Hockey | P|R | Figure Skating | P|R |

*Figure 9*

MEDIA PLANNER

TECHNICAL FIELD

This invention relates to media entertainment systems and, in particular, to architectures that support a media planner.

BACKGROUND

Many media entertainment systems provide electronic program guides (EPGS) that allow users to interactively select programs in which they are interested. FIG. 1 illustrates a prior art electronic program guide grid. The prior art EPG grid 100 displays program titles arranged in a grid that associates each program title with a broadcast channel 102 and a broadcast time 104. Each program is represented by a cell in the grid and the size of each cell indicates the duration of the program. For example, cell 106 represents the one hour program titled, "General Hospital," which is scheduled for broadcast on channel 4 beginning at 2:00 pm and ending at 3:00 pm. Cell 108 is smaller than cell 106 because it represents the one-half hour program titled, "Garfield," which is scheduled for broadcast on channel 3 beginning at 2:30 pm and ending at 3:00 pm.

With the prior art EPG grid 100, it can be difficult for a television viewer to determine programs they may be interested in watching. Typically, the EPG grid 100 displays only 2-3 hours of the broadcast schedule (horizontally) for approximately 15-20 channels (vertically) at one time. To see additional portions of the schedule, either more channels or more times, the television viewer must scroll through the EPG grid, horizontally and/or vertically. For example, a television viewer may have three hours in the evening during which he or she is available to watch television. The television viewer may spend a significant amount of that time scrolling through an EPG grid 100 trying to locate one or more programs of interest that are being broadcast during that time period on all of the available channels.

Also, because the cells of the EPG grid vary in size based on the duration of the represented television program, it is difficult for a viewer to quickly determine television programs that are scheduled for broadcast during a particular time of day, for example, prime time. In the EPG grid 100, programs of the same duration that have the same start time are aligned, but programs with different durations and/or different start times are not aligned in a single column.

Additionally, a viewer may choose to plan an entire week's worth of television viewing at a single sitting. For example, if the viewer has a digital video recorder, he or she may wish to schedule several programs to be recorded throughout the week to be viewed at the viewer's convenience. The prior art EPG grid 100 is a very cumbersome tool for this purpose.

SUMMARY

An architecture that supports a media planner is described. The described architecture has a system to receive electronic program guide data and generate a media planner layout for displaying descriptors associated with scheduled programs arranged according to days and day parts.

BRIEF DESCRIPTION OF THE DRAWINGS

The same numbers are used throughout the drawings to reference like features and components.

FIG. 1 illustrates a prior art electronic program guide grid.

FIG. 6 illustrates the layout of an exemplary media planner.

FIG. 7 illustrates a portion of a media planner displaying recommended television programs.

FIG. 8 illustrates the display of additional program information associated with a selected program.

FIG. 9 illustrates the display of a program record request confirmation.

DETAILED DESCRIPTION

The following discussion is directed to a media planner implemented as part of a television-based entertainment system, such as an interactive TV network, a cable network that utilizes an electronic program guide, and a Web-enabled TV network. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described media planner can be used in any of these systems and for any types of client devices, it is described in the context of the following exemplary environment.

Exemplary Environment

Figure 2:
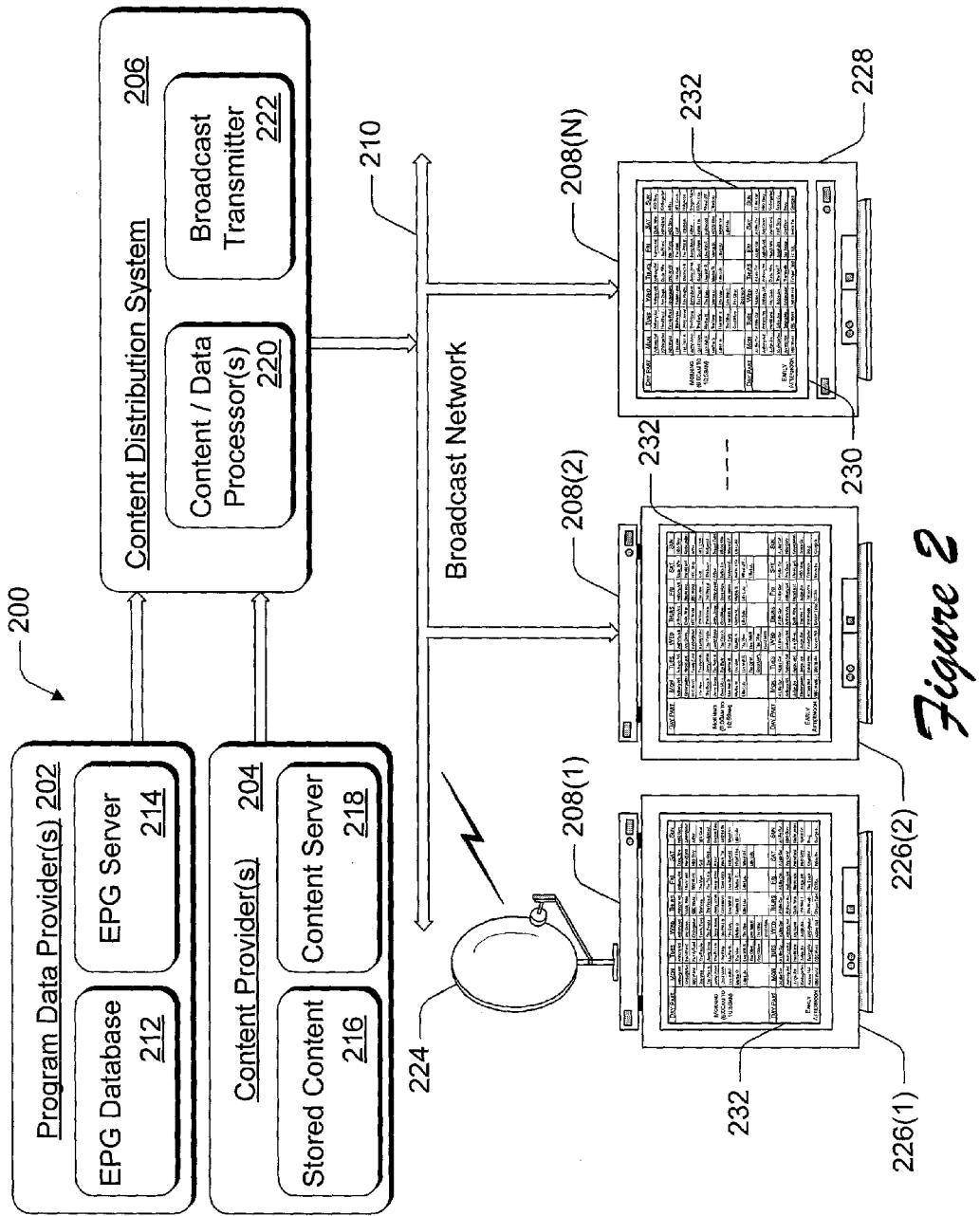
FIG. 2 is a block diagram of an exemplary media entertainment system in which a media planner may be implemented.

FIG. 2 illustrates an exemplary environment 200 in which a media planner may be implemented. Exemplary environment 200 is a television entertainment system that facilitates distribution of content and program data to multiple viewers. The environment 200 includes one or more program data providers 202, one or more content providers 204, a content distribution system 206, and multiple client devices 208(1), 208(2), . . . , 208(N) coupled to the content distribution system 206 via a broadcast network 210.

Program data providers 202 include an electronic program guide (EPG) database 212 and an EPG server 214. The EPG database 212 stores electronic files of program data, which can be used to generate an electronic program guide (or, "program guide"). Program data includes program identifiers, program titles, ratings, characters, descriptions, actor names, station identifiers, channel identifiers, schedule information, and so on. The terms "program data" and "EPG data" are used interchangeably throughout this discussion. For discussion purposes, an electronic file maintains program data that includes a program descriptor (e.g., a title), a broadcast date to identify dates on which the program will be broadcast, and a broadcast time to identify the time at which the broadcast will begin.

The EPG server 214 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 214 controls distribution of the published version of the program data from program data provider 202 to the content distribution system 206 using, for example, a file transfer protocol (FTP) over a TCP/IP network (e.g., Internet, UNIX, etc.).

Content providers 204 include a content server 218 and stored content 216, such as movies, television programs, commercials, music, and similar audio and/or video content. Content server 218 controls distribution of the stored content 216 from content provider 204 to the content distribution system 206. Additionally, content server 218 controls distribution of live content (e.g., content that was not previously stored, such as live feeds) and/or content stored at other locations to the content distribution system 206.

Content distribution system 206 contains one or more content and EPG data processors 220 and a broadcast transmitter 222. Content and EPG data processor 220 processes the program data received from program data provider 202 and the content received from content provider 204 prior to transmitting the program data and content across broadcast network 210. A particular content processor may encode, or otherwise process, the received data or content into a format that is understood by the multiple client devices 208(1), 208(2), . . . , 208(N) coupled to broadcast network 210. Broadcast transmitter 222 broadcasts signals, such as cable television signals, across broadcast network 210.

Broadcast network 210 can include a cable television network, RF, microwave, satellite, and/or data network, such as the Internet, and may also include wired or wireless media using any broadcast format or broadcast protocol. Additionally, broadcast network 210 can be any type of network, using any type of network topology and any network communication protocol, and can be represented or otherwise implemented as a combination of two or more networks.

Environment 200 can include any number of content providers and any number of program data providers coupled to any number of content distribution systems.

Content distribution system 206 is representative of a headend service that provides EPG data, as well as content, to multiple subscribers. Each content distribution system 206 may receive a slightly different version of the program data that takes into account different programming preferences and lineups. The EPG server 214 may create different versions of EPG data (e.g., different versions of a program guide) that include those channels of relevance to respective headend services. Content distribution system 206 transmits the EPG data to the multiple client devices 208(1), 208(2), . . . , 208(N). In one implementation, for example, distribution system 206 utilizes a carousel file system to repeatedly broadcast the EPG data over an out-of-band (OOB) channel to the client devices 208.

Client devices 208 can be implemented in a number of ways. For example, a client device 208(1) receives broadcast content from a satellite-based transmitter via a satellite dish 224. Client device 208(1) is also referred to as a set-top box or a satellite receiving device. Client device 208(1) is coupled to a television 226(1) for presenting the content received by the client device (e.g., audio data and video data), as well as a graphical user interface. A particular client device 208 can be coupled to any number of televisions 226 and/or similar devices that can be implemented to display or otherwise render content. Similarly, any number of client devices 208 can be coupled to a television 230. For example, a personal computer may be implemented as an additional client device capable of receiving EPG data and/or media content and communicating with a set-top box or television.

Client device 208(2) is also coupled to receive broadcast content from broadcast network 210 and provide the received content to associated television 226(2). Client device 208(N) is an example of a combination television 228 and integrated set-top box 230. In this example, the various components and functionality of the set-top box are incorporated into the television, rather than using two separate devices. The set-top box incorporated into the television may receive broadcast signals via a satellite dish (similar to satellite dish 224) and/or via broadcast network 210. In alternate implementations, client devices 208 may receive broadcast signals via the Internet or any other broadcast medium.

Each client 208 runs an electronic program guide (EPG) application that utilizes the program data to generate an EPG grid as shown in FIG. 1. The EPG application also utilizes the program data to generate a media planner 232 that enables a television viewer to identify programs of interest. With the media planner, the television viewer can look at a weekly broadcast schedule of recommended programs, view additional information about scheduled programs, and/or enter instructions to record one or more programs. The media planner 232 is described below in more detail.

Exemplary Client Device

Figure 3:
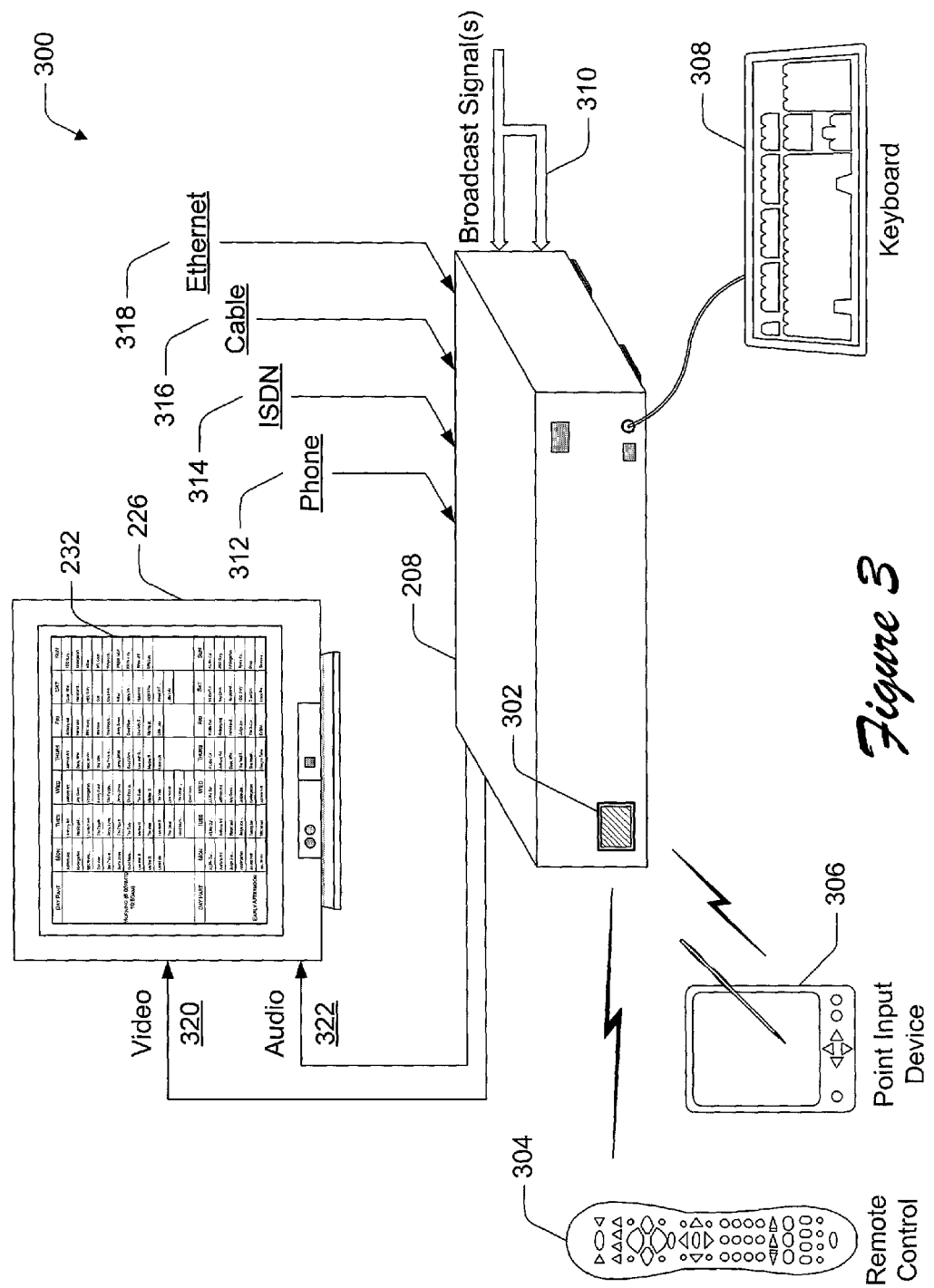
FIG. 3 is a block diagram of an exemplary implementation of a client device shown as a standalone unit that connects to a television.

FIG. 3 illustrates an exemplary implementation 300 of a client device 208 shown as a standalone unit that connects to a television 226. Client device 208 can be implemented in any number of embodiments, including as a set-top box, a satellite receiver, a TV recorder with a hard disk, a game console, an information appliance, a personal computer, and so forth. Client device 208 includes a wireless receiving port 302, such as an infrared (IR) or Bluetooth wireless port, for receiving wireless communications from a remote control device 304, a handheld input device 306, or any other wireless device, such as a wireless keyboard. Handheld input device 306 can be a personal digital assistant (PDA), handheld computer, wireless phone, or the like. Additionally, a wired keyboard 308 is coupled to communicate with the client device 210. In alternate embodiments, remote control device 304, handheld device 306, and/or keyboard 308 may use an RF communication link or other mode of transmission to communicate with client device 208.

Client device 208 receives one or more broadcast signals 310 from one or more broadcast sources, such as from a satellite, the Internet, or a broadcast network. Client device 208 includes hardware and/or software for receiving and decoding broadcast signal 310, such as an NTSC, PAL, SECAM or other TV system video signal. Client device 208 also includes hardware and/or software for providing the user with a graphical user interface by which the user can, for example, access various network services, configure the client device 208, and perform other functions.

Client device 208 is capable of communicating with other devices via one or more connections including a conventional telephone link 312, an ISDN link 314, a cable link 316, and an Ethernet link 318. Client device 208 may use any one or more of the various communication links 312-318 at a particular instant to communicate with any number of other devices.

Client device 208 generates video signal(s) 320 and audio signal(s) 322, both of which are communicated to television 226. The video signals and audio signals can be communicated from client device 208 to television 226 via an RF (radio frequency) link, S-video link, composite video link, component video link, or other communication link. Although not shown in FIG. 3, client device 208 may include one or more lights or other indicators identifying the current status of the device. Additionally, the client device may include one or more control buttons, switches, or other selectable controls for controlling operation of the device.

Figure 4:
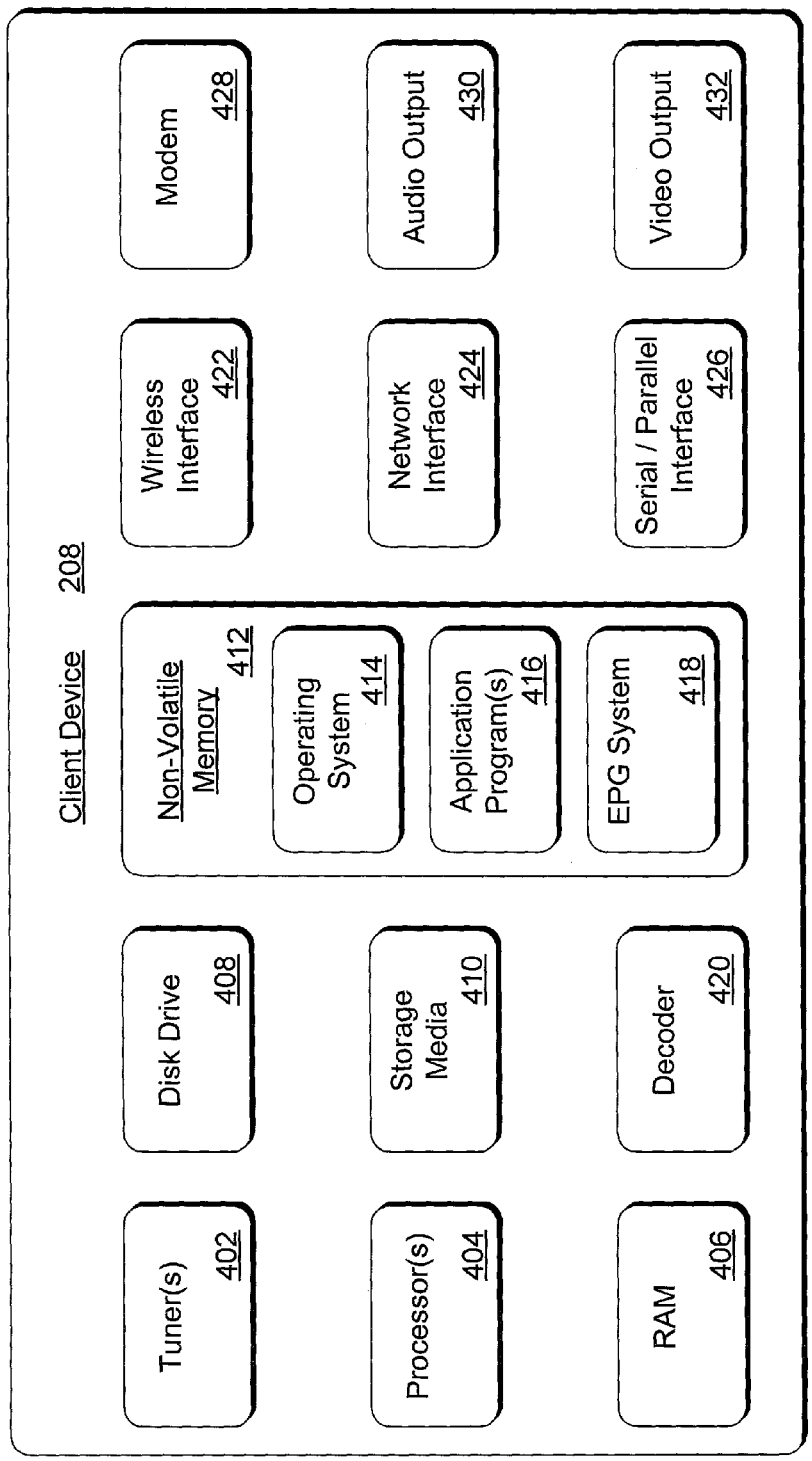
FIG. 4 is a block diagram of selected components of the client device shown in FIGS. 2 and 3.

FIG. 4 illustrates selected components of client device 208 shown in FIGS. 2 and 3. Client device 208 includes one or more tuners 402. Tuners 402 are representative of one or more in-band tuners that tune to various frequencies or channels to receive television signals, as well as an out-of-band tuner that tunes to the broadcast channel over which the EPG data is broadcast to client device 208.

Client device 208 also includes one or more processors 404 and one or more memory components. Examples of possible memory components include a random access memory (RAM) 406, a disk drive 408, a mass storage component 410, and a non-volatile memory 412 (e.g., ROM, Flash, EPROM, EEPROM, etc.). Alternative implementations of client device 208 can include a range of processing and memory capabilities, and may include more or fewer types of memory components than those illustrated in FIG. 4. For example, full-resource clients can be implemented with substantial memory and processing resources, including the disk drive 408 to store content for replay by the viewer. Low-resource clients, however, may have limited processing and memory capabilities, such as a limited amount of RAM 406, no disk drive 408, and limited processing capabilities.

Processor(s) 404 process various instructions to control the operation of client device 208 and to communicate with other electronic and computing devices. The memory components (e.g., RAM 406, disk drive 408, storage media 410, and non-volatile memory 412) store various information and/or data such as content, EPG data, configuration information for client device 208, and/or graphical user interface information.

An operating system 414 and one or more application programs 416 may be stored in non-volatile memory 412 and executed on processor 404 to provide a runtime environment. A runtime environment facilitates extensibility of client device 208 by allowing various interfaces to be defined that, in turn, allow application programs 416 to interact with client device 208. In the illustrated example, an EPG system 418 is stored in memory 412 to operate on the EPG data to generate an EPG grid or a media planner. The application programs 416 that may be implemented at client device 208 can include a browser to browse the Web, an email program to facilitate electronic mail, and so on. Client device 208 can also include other components pertaining to a television entertainment system which are not illustrated in this example for simplicity purposes. For instance, client device 208 can include a user interface application and user interface lights, buttons, controls, etc. to facilitate viewer interaction with the device.

Client device 208 also includes a decoder 420 to decode a broadcast video signal, such as an NTSC, PAL, SECAM or other TV system video signal. Client device 208 further includes a wireless interface 422, a network interface 424, a serial and/or parallel interface 426, and a modem 428. Wireless interface 422 allows client device 208 to receive input commands and other information from a user-operated input device, such as from a remote control device or from another IR, Bluetooth, or similar RF input device.

Network interface 424 and serial and/or parallel interface 426 allows client device 208 to interact and communicate with other electronic and computing devices via various communication links. Although not shown, client device 208 may also include other types of data communication interfaces to communicate with other devices. Modem 428 facilitates communication between client device 208 and other electronic and computing devices via a conventional telephone line.

Client device 208 also includes an audio output 430 and a video output 432 that provide signals to a television or other device that processes and/or presents or otherwise renders the audio and video data. Although shown separately, some of the components of client device 208 may be implemented in an application specific integrated circuit (ASIC). Additionally, a system bus (not shown) typically connects the various components within client device 208. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 208. As used herein, "client device" means any electronic device having data communications, data storage capabilities, and/or functions to process signals, such as broadcast signals, received from any of a number of different sources. In one implementation, functionality of the client device may be distributed such that one device, for example a personal computer, renders the media planner and/or EPG grid and communicates with a set-top box that receives and processes broadcast signals.

Exemplary EPG System

Figure 5:
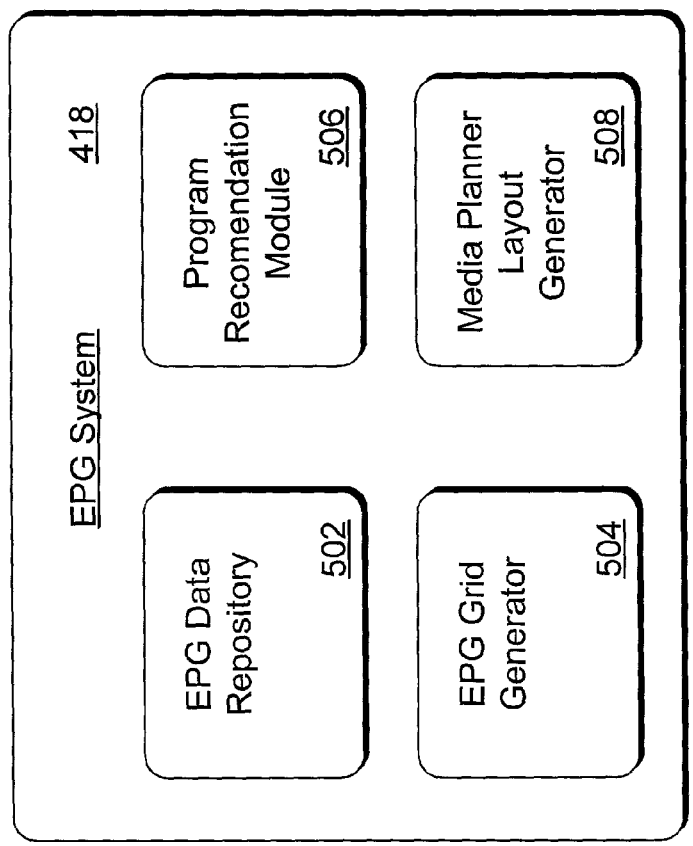
FIG. 5 is a block diagram of selected components of the EPG system component of the client device.

FIG. 5 illustrates selected components of EPG system 418 according to one possible implementation. EPG system 418 includes an EPG data repository 502, an EPG grid generator 504, a program recommendation module 506, and a media planner layout generator 508. EPG data repository 502 stores EPG data received from the content distribution system 206. EPG grid generator 504 generates an EPG grid, which can be displayed as described with reference to FIG. 1.

The program recommendation module 506 selects programs represented by is the EPG data that the television viewer may be interested in. The selection of recommended programs may be based on programs or channels that the viewer has previously watched either at the same scheduled broadcast time or at a different broadcast time, programs or channels watched by others who also watched programs or channels that the viewer watched, viewer-specified favorites, program genre, and/or viewer subscriptions. Additional criteria and/or combinations of criteria may also be used to select recommended programs.

The media planner layout generator 508 processes EPG data associated with programs selected by the program recommendation module 506 and arranges the EPG data according to a media planner layout. The EPG data arranged according to the media planner layout may then be displayed as a media planner. In one implementation, the media planner layout generator 508 generates the media planner layout based on an available display resolution. For example, more program descriptors may be displayed in the media planner layout when a larger display resolution is available.

Exemplary Media Planner Layout

FIG. 6 illustrates an exemplary layout 232 in which selected EPG data may be arranged. The media planner layout includes schedule areas 602(1), 602(2), 602(3), 602(4), . . ., 602(N), which each represent a portion of a particular day. Individual days 604 are represented across the top of the media planner layout. Day parts 606 are represented down the side of the media planner layout. For example schedule area 602(1) represents Monday morning between 6:00 am and 10:59 am and schedule area 602(4) represents Tuesday early afternoon between 11:00 am and 3:59 pm. The day parts 606 are of arbitrary length and may be configured based on a viewer's viewing behavior. For example, a media planner layout 232 may include only three day parts representing morning (12:01 am-11:59 am), afternoon (12:00 pm-4:59 pm), and evening (5:00 pm-11:59 pm). The media planner layout 232 may include any number of day parts with each day part representing any duration of time during a day. The media planner layout generator 508 arranges, in the schedule areas 602, tiles that represent recommended television programs and available options associated with the programs. Similar media planner layouts are also contemplated that may include more or fewer days 604 and/or more or fewer day parts 606 in varying arrangements.

Optional filter selection tabs 608, 610, and 612 may be displayed with the media planner to allow a television viewer to specify criteria for selecting the programs to be represented in the media planner. For example, a viewer may select the Favorites tab 608 to have user-specified favorite programs displayed in the media planner. The viewer may select the Sports tab 610 to have programs that are associated with a sports genre displayed in the media planner.

FIG. 7 illustrates a portion of a generated media planner layout displaying recommended television programs. Tiles representing television programs are arranged in schedule areas, as described above. For example, tiles that represent recommended programs that are scheduled for broadcast on Monday between 6:00 am and 10:59 am are arranged in schedule area 602(1).

The viewer may select a tile to tune to the represented program if the program is currently being broadcast, or to display, if available, a website associated with the program. For example, the viewer may select tile 702 associated with "The View" to display the program if it is currently being broadcast. If "The View" is not currently being broadcast, then selecting the associated tile 702 may cause a website associated with the program to be displayed.

Each tile may also include selectable tabs that provide access to other functionality that is available in association with a program. For example, the "P" tab 704 on the "Martha Stewart Living" tile can be selected to obtain additional information associated with the scheduled program. The "R" tab 706 can be selected to schedule the program for recording. Depending on the supported functionality, additional tabs in varying combinations may be included on one or more tiles within the media planner layout.

In one implementation, a viewer may select a day indicator, such as Monday 708 to display the prior art EPG grid as shown in FIG. 1. If the viewer identifies one or more additional programs that were not displayed on the media planner, the viewer may select them from the EPG grid, identifying them as "favorite" programs to be displayed in the future in the media planner.

In another implementation, a viewer may select a program in the media planner and indicate that the program is no longer of interest so that the program will no longer be displayed in the media planner.

FIG. 8 illustrates the display of additional program information associated with a selected program. When a user selects the "P" tab 704, additional information associated with the scheduled program is displayed. The information may include the scheduled broadcast date and time, the scheduled broadcast channel, and a short description of the program.

FIG. 9 illustrates the display of a program record request confirmation. When a user selects the "R" tab 706, the associated program is scheduled to be recorded. The request confirmation 902 may include a details area 904 that displays detailed information about the program and an options area 906 that displays details about the selected options associated with recording the program. The record options may vary depending on the functionality supported by the client DVR.

Generating Media Planner Layout

Figure 10:
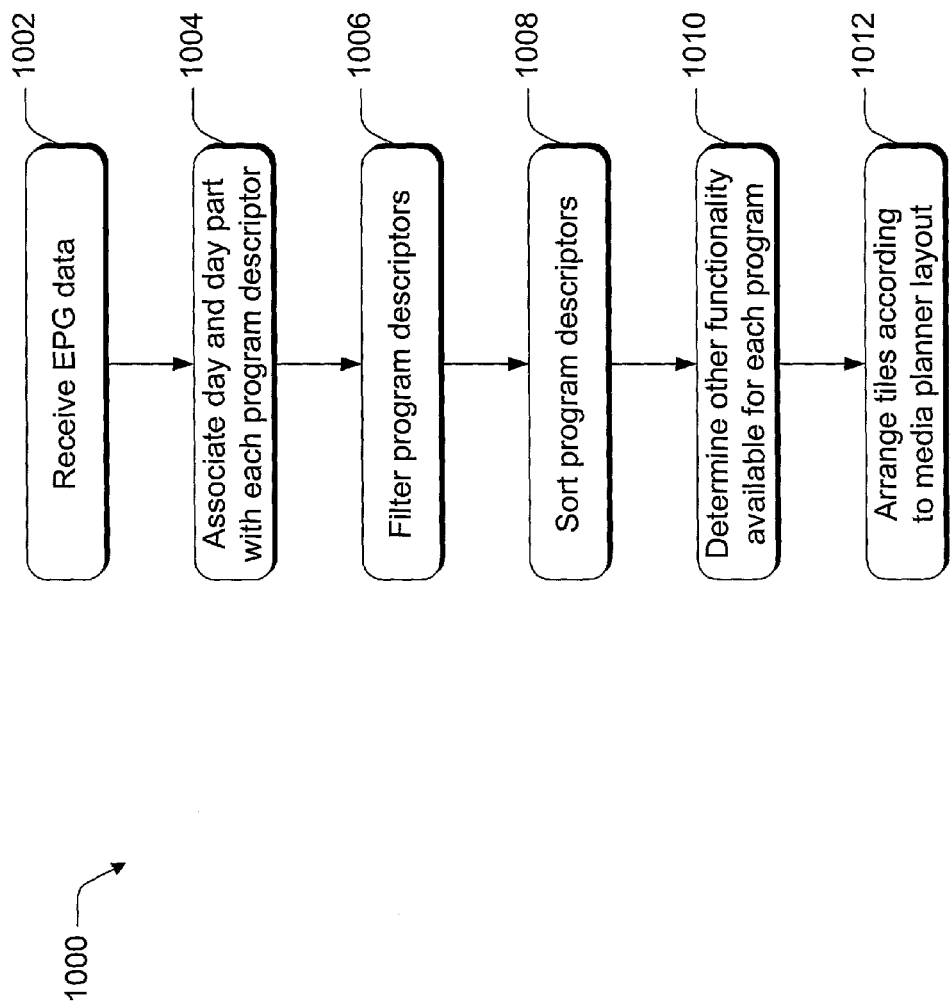
FIG. 10 illustrates a process for generating a media planner layout for display.

FIG. 10 illustrates a process for generating a media planner layout for display. The process is illustrated as a set of operations shown as discrete blocks. The process may be implemented in any suitable hardware, software, firmware, or combination thereof. The order in which the operations are described is not to be construed as a limitation. Where appropriate, the process will be described with respect to components illustrated in FIGS. 2, 5, 6, and 7. The process is described as implemented in its entirety on a client device 208, for example a set-top box. Portions of the process may alternatively be implemented by a program data provider 202 and/or a content distribution system 206.

At block 1002, client device 208 receives EPG data from content distribution system 206. The received EPG data is received and stored in the EPG data repository component 502 of the EPG system 418 that is implemented as part of the client device 208. The received EPG data includes descriptors that identify programs (e.g., television programs, movies, video-on-demand, and/or music) that are scheduled for broadcast. The received EPG data also includes broadcast information, such as broadcast channels, broadcast dates, and broadcast times, and may also include additional information related to the scheduled programs. The content distribution system 206 may broadcast EPG data to the client device 208 at regular intervals (e.g., hourly, daily, or weekly) and/or the content distribution system 206 may broadcast EPG data to the client device 208 in response to a request from the client device 208. For example, the content distribution system 206 may broadcast updated EPG data to client device 208 once a day that describes programs scheduled for broadcast during the next seven days.

At block 1004, the EPG system 418 associates a day and a day part with each descriptor that identifies a scheduled program. The day and day part are associated based on the scheduled broadcast date and broadcast time of the program, respectively. For example, descriptors that identify programs scheduled for broadcast on Apr. 19, 2002 are associated with the day, "Friday". Descriptors that identify programs scheduled for broadcast beginning between 6:00 am and 10:59 am are associated with the day part "Morning".

At block 1006, the program recommendation module 506 filters the descriptors. The EPG data received from the content distribution system most likely includes descriptors that identify programs that the viewer is not interested in. The program recommendation module 506 filters the descriptors to select programs that the viewer is most likely to be interested in.

In one implementation, the program recommendation module 506 maintains a repository of programs and channels that a viewer views, listens to, or records. When the program recommendation module 506 filters the received EPG data, the descriptors that identify programs or channels that the viewer has previously viewed, listened to, or recorded are selected. Optionally, the broadcast times and/or day parts of the scheduled program and the previously viewed program or channel may also be compared to further filter the selection. For example, the program recommendation module 506 may select only those programs that are scheduled for broadcast during the same day part as when the same program or channel was previously viewed.

In one implementation, the repository of programs and channels that a viewer views, listens to, or records that is maintained by the program recommendation module 506 stores indicators of only those channels or programs that a viewer views for at least five minutes (or some other configurable time period). The configurable time period is used to differentiate programs or channels that a viewer is actually viewing from programs or channels that a viewer is briefly examining while channel surfing to find a program of interest.

In another implementation, the program recommendation module 506 may access data that describes the viewing habits of other viewers. The program recommendation module selects descriptors that identify programs that have been previously viewed, listened to, or recorded by other viewers who also viewed, listened to, or recorded programs that the present viewer has viewed, listened to, or recorded. For example if a viewer has previously viewed the program, "Third Watch," the program recommendation module 506 may also select the program "Law and Order" based on data that indicates that other viewers who have viewed "Third Watch" have also viewed "Law and Order".

In another implementation, a viewer may designate one or more "favorite" programs to always be selected through the filtering process performed by the program recommendation module 506.

In another implementation, the program recommendation module 506 selects new programs (e.g., programs that have been broadcast for less than one month).

In alternate implementations, the program recommendation module 506 may select programs based on a subscription associated with the client device or the user. For example, if the viewer subscription does not include access to HBO, then programs scheduled for broadcast on HBO are not selected. Alternatively, programs scheduled for broadcast on networks or channels that the viewer may subscribe to may be selected. For example, the user may have the option to subscribe to HBO, so the program recommendation module 506 may include programs scheduled for broadcast on HBO.

Other factors that may be used in filtering the EPG data may include ratings such as those generated by Nielsen Media Research. In such an implementation, the program recommendation module 506 may select, for example, the top ten rated television programs. Alternatively, television or movie ratings may be used to select only programs that are rated as suitable for audiences under the age of 17.

In another implementation, the program recommendation module 506 may select programs based on one or more genre associated with the programs.

Alternate filtering criteria are also contemplated in addition to the use of combined filtering criteria. For example, the program recommendation module 506 may combine filters to select the top ten drama series according to the Nielsen Media Research ratings that are suitable for children under 17.

At block 1008, the program recommendation module 506 sorts the selected program descriptors. Any number of techniques may be used to sort the selected program descriptors, including alphabetical or according to a rank. The rank may be based on a determination of how likely it is that the viewer will be interested in the program. Ratings generated by Nielson Media Research are one example of a rank that may be used to sort selected programs. Another rank may be based on the frequency or length of viewing time (duration) with which a viewer has previously viewed, listened to, or recorded a particular program.

At block 1010, the EPG system 418 determines functionality that is available in association with each selected program. As described with reference to FIGS. 7-9, available functionality may include access to additional information about the program or the ability to schedule a program to be recorded.

At block 1012, the media planner layout generator 508 arranges tiles that represent the selected programs according to a media planner layout. The media planner layout generator 508 generates, for each selected program, a tile for displaying a program descriptor and selectable indicators representing the functionality available in association with the program. The media planner layout generator 508 then arranges the tiles in schedule areas 602 where each column represents a day and each row represents a day part, according to a media planner layout as described with reference to FIG. 6. Multiple tiles may be arranged in each schedule area 602. Within each schedule area 602, the tiles are arranged in order based on the sorting performed as described with reference to block 1008.

Conclusion

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:
1. A method, comprising:
receiving, at a client device, a plurality of descriptors associated with a plurality of programs scheduled for broadcast, wherein the plurality of programs are scheduled for broadcast on a plurality of different broadcast channels;
generating a graphical user interface that is structured as a two-dimensional grid with days represented on a first axis and day parts represented on a second axis, the day parts each representing a block of time greater than one hour;
associating, via a processor executing on the client device, a day and day part with each descriptor, the day being based on a scheduled broadcast date and the day part being based on a scheduled broadcast time; and
generating a layout of descriptor blocks for display on the graphical user interface, each of the descriptor blocks displaying a descriptor associated with a particular program and being equal in size, regardless of program duration, such that the descriptor blocks are presented in the two-dimensional grid of the graphical user interface according to day and day part, such that within a portion of the two-dimensional grid corresponding to a particular day and a particular day part, multiple descriptor blocks are displayed in a non-temporal order, representing programs that are scheduled for broadcast on the particular day during the particular day part, and on any number of a plurality of channels, such that each descriptor block does not directly correspond to an indicated actual broadcast start time.

2. The method as recited in claim 1, wherein the descriptors comprise at least one of a title, an actor name, a director name, a year, and a plot description.

3. The method as recited in claim 1, wherein the programs scheduled for broadcast comprise at least one of television programs, movies, video-on-demand, and music.

4. The method as recited in claim 1, wherein the day parts are of arbitrary length and are configured based on viewer behavior.

5. The method as recited in claim 1, wherein the generating further comprises ordering the display of the descriptor blocks according to a rank.

6. The method as recited in claim 5, wherein the rank is based on ratings associated with the programs.

7. The method as recited in claim 5, wherein the rank is based on a frequency with which a viewer previously viewed a program.

8. The method as recited in claim 5, wherein the rank is based on a duration with which a viewer previously viewed a program.

9. The method as recited in claim 1, wherein the generating further comprises sorting the descriptors alphabetically.

10. The method as recited in claim 1, wherein the generating further comprises:
determining an available display resolution; and
using the available display resolution to determine a number of descriptors to arrange.

11. The method as recited in claim 1, further comprising:
filtering the descriptors that are received to select descriptors associated with recommended programs; and
generating a layout of the descriptors that are selected.

12. The method as recited in claim 1, further comprising:
receiving an indication of a program that a viewer is not interested in; and
preventing a descriptor associated with the program that the viewer is not interested in from being displayed.

13. The method as recited in claim 1, further comprising:
receiving an indication of a selected descriptor; and
displaying a website associated with the program that is associated with the selected descriptor.

14. The method as recited in claim 1, further comprising:
receiving an indication of a selected descriptor block; and
subsequently displaying, via the graphical user interface, additional information associated with the program that is associated with the selected descriptor block, the additional information not being previously displayed or indicated in the two-dimensional grid.

15. The method as recited in claim 14, wherein the additional information comprises a broadcast channel, an actual broadcast time, a duration, and a plot description.

16. The method as recited in claim 1, further comprising:
receiving an indication of a selected descriptor; and
scheduling a media recorder to record the program associated with the selected descriptor.

17. The method as recited in claim 16, wherein the media recorder comprises a digital video recorder.

18. The method as recited in claim 1, further comprising:
receiving an indication of a selected descriptor block;
determining that the program associated with the selected descriptor block is currently being broadcast; and
causing the broadcast of the program that is associated with the selected descriptor block to be displayed.

19. The method as recited in claim 1, further comprising:
receiving an indication of a selected day along the first axis of the two-dimensional grid; and
displaying descriptors associated with programs scheduled for broadcast on a date associated with the selected day, the descriptors displayed in an electronic program guide grid arranged in a two-dimensional grid by broadcast channel and broadcast time.

20. The method as recited in claim 1, wherein the generating further comprises:
determining viewing preferences of a viewer; and
sorting the descriptors according to a rank based on frequencies with which other viewers, having viewing preferences similar to the viewing preferences of the viewer, have viewed the programs associated with the descriptors.

21. A method, comprising:
receiving, at a client device, a plurality of descriptors associated with a plurality of programs scheduled for broadcast, wherein the plurality of programs are broadcast on a plurality of different channels;
filtering, via a processor executing on the client device, the descriptors to select recommended descriptors that are associated with recommended programs; and
generating a layout of the recommended descriptors for display on a graphical user interface, such that the recommended descriptors are presented via the graphical user interface according to a plurality of day parts arranged in a plurality of rows and a plurality of broadcast days arranged in a plurality of columns, wherein:
a first column represents a first day and a second column represents a different second day;
for each of the plurality of broadcast days, a group of recommended descriptors are listed in a non-temporal order and the group is associated with a corresponding one of the plurality of day parts;
broadcast channels are not initially presented via the graphical user interface; and
the layout is generated in association with a weekly media planner presenting the recommended descriptors via a single display screen.

22. The method as recited in claim 21, wherein the filtering comprises selecting recommended descriptors that are associated with one or more new programs.

23. The method as recited in claim 21, wherein the filtering comprises:
determining a rating threshold; and
selecting recommended descriptors that are associated with programs rated by a rating authority, the programs having a rating within the rating threshold.

24. The method as recited in claim 21, wherein the filtering comprises:
determining a genre; and
selecting recommended descriptors that are associated with programs that are associated with the genre.

25. The method as recited in claim 21, wherein the filtering comprises:
determining a viewer identity; and
selecting recommended descriptors based on the viewer identity.

26. The method as recited in claim 25, wherein the selecting recommended descriptors comprises:
selecting a descriptor that is associated with a program or broadcast channel that a viewer associated with the viewer identity has previously selected.

27. The method as recited in claim 26, wherein a day part associated with the descriptor is the same as a day part associated with the program or broadcast channel that the viewer associated with the viewer identity has previously selected.

28. The method as recited in claim 25, wherein the selecting recommended descriptors comprises:

determining a program that a viewer associated with the viewer identity has previously selected;

determining another viewer that has selected the program; and selecting a descriptor that is associated with another program that the other viewer has selected.

29. The method as recited in claim 25, wherein the selecting recommended descriptors comprises:

selecting descriptors that are associated with programs that are scheduled to be broadcast on channels that a viewer associated with the viewer identity has access to, based on a subscription associated with the viewer.

30. The method as recited in claim 25, wherein the selecting recommended descriptors comprises:

receiving an indication of one or more favorite programs from a viewer associated with the viewer identity; and selecting descriptors that are associated with the favorite programs.

31. The method as recited in claim 25, wherein the selecting recommended descriptors comprises:

determining a channel that a viewer associated with the viewer identity may subscribe to; and selecting descriptors that are associated with programs that are scheduled for broadcast on the channel that the viewer associated with the viewer identity may subscribe to.

32. A system, comprising:

one or more processors;

a memory configured to store computer-executable instructions that, when executed by the one or more processors, configure a graphical user interface to generate a display screen, comprising:

a two-dimensional grid having a plurality of day indicators along a first axis of the grid and a plurality of day part indicators along a second axis of the grid; and a plurality of schedule areas within the grid, each displaying a plurality of equal sized tiles via the display screen, each tile representing a scheduled program, each schedule area associated with a day indicator and a day part indicator, wherein:

the display screen is generated in association with a weekly media planner presenting the plurality of approximately equal sized tiles;

at least one tile is associated with a first day indicator;

at least one tile is associated with a second day indicator; and for each of the plurality of schedule areas, the plurality of equal sized tiles are listed in a non-temporal order such that there is no direct link between a particular scheduled program start time and a tile representing the particular scheduled program.

33. The system as recited in claim 32, wherein the day indicators are selected from a group of day indicators comprising Monday, Tuesday, Wednesday, Thursday, Friday, Saturday, and Sunday.

34. The system as recited in claim 32, wherein the day part indicators are selected from a group of day part indicators comprising morning, early afternoon, evening, prime time, late night, 6:00 am-10:59 am, 11:00 am-3:59 pm, 4:00 pm-6:59 pm, 7:00 pm-10:59 pm, and 11:00 pm-5:59 pm.

35. The system as recited in claim 32, wherein the plurality of schedule areas display different numbers of tiles.

36. The system as recited in claim 32, wherein the display screen further comprises a filter selection area that allows a user to select a filter to apply to the displayed tiles.

37. The system as recited in claim 36, wherein the filter to apply to the displayed tiles is selected from a group of filters comprising favorites, movies, sports, drama, comedy, and music.

38. The system as recited in claim 32, wherein the display screen further comprises a selectable indicator that represents a function associated with a scheduled program.

39. The system as recited in claim 38, wherein the function is selected from a group of functions comprising providing additional information associated with the scheduled program and selecting the scheduled program to be recorded.

40. A system, comprising:

a processor;

a memory;

a data repository in the memory to store descriptors, broadcast dates, and broadcast times associated with programs scheduled for broadcast, wherein the programs scheduled for broadcast correspond to a plurality of different channels; and a layout generator executed by the processor to generate a layout of the descriptors for display, the layout arranging the descriptors such that each descriptor is associated with a day based on a broadcast date and a day part based on a broadcast time, wherein:

the layout includes descriptors associated with the programs for a plurality of broadcast dates; and for each of a plurality of day parts, a group of descriptors are listed in a non-temporal order and the group is associated with a corresponding one of the plurality of day parts.

41. The system as recited in claim 40, further comprising a selector to select the descriptors to be displayed.

42. The system as recited in claim 40, further comprising an EPG grid generator to generate for subsequent display, additional information for a particular descriptor comprising a broadcast channel, a broadcast time, and a broadcast duration.

43. The system as recited in claim 40, further comprising a sorter that arranges the descriptors to be displayed according to a rank.

44. A media planning system, comprising:

a memory;

a processor;

storage means, implemented as part of the memory, for storing a plurality of descriptors associated with a plurality of programs, wherein the plurality of programs are associated with a plurality of broadcast dates and a plurality of broadcast channels; and planner generation means, executed by the processor, for generating a layout of the descriptors, the layout arranging the descriptors such that each descriptor is associated with a day based on a broadcast date associated with the descriptor and a day part based on a broadcast time associated with the descriptor, wherein for each of a plurality of day parts associated with a particular day, a group of descriptors is listed in a non-temporal order and the group is associated with a corresponding one of the plurality of day parts.

45. The media planning system as recited in claim 44, further comprising a filtering means for filtering the descriptors that are stored to select descriptors to be displayed.

46. The media planning system as recited in claim 44, further comprising a sorting means for sorting the descriptors to be displayed based on a rank.

47. One or more computer-readable storage media comprising computer-executable instructions that, when executed, configure a computing system to perform operations comprising:
- receiving data describing programs scheduled for broadcast, wherein:
  - a first of the programs is scheduled for broadcast on a first date and a second of the programs is scheduled for broadcast on a second date; and
  - the first and second programs are broadcast on different channels;
- filtering the data describing programs scheduled for broadcast to select descriptors to be displayed;
- sorting the selected descriptors according to a rank, wherein the rank is based on an interest of a viewer in the programs scheduled for broadcast;
- determining additional functionality that is available in association with each selected descriptor;
- generating a display layout that arranges the selected descriptors associated with the programs such that each descriptor is associated with a day and a day part, wherein the day is based on a scheduled broadcast date associated with the descriptor and the day part is based on a scheduled broadcast start time associated with the descriptor, and wherein:
  - the display layout includes a descriptor associated with the first of the programs and a descriptor associated with the second of the programs;
  - the descriptor associated with the first of the programs and the descriptor associated with the second of the programs are not displayed in broadcast program slots corresponding directly to a starting time; and
  - the display layout is presented in association with a weekly media planner such that a viewer is presented, via a single display screen presenting the display layout, with the selected descriptors corresponding to each of seven days in a week;
- displaying the display layout so that the selected descriptors associated with the first date are displayed in a first column, and the selected descriptors associated with the second date are displayed in a second column, wherein each column includes one or more schedule areas that each display a plurality of equal sized tiles corresponding to the selected descriptors, such that the size of the tiles does not correspond to a duration of a represented program;
- receiving an indication from the viewer selecting a particular descriptor; and
- in response to the indication, generating a subsequent display of information associated with a program associated with the particular selected descriptor.

48. The one or more computer-readable storage media as recited in claim 47, further comprising computer-executable instructions that, when executed, configure the computer system to:
- determine an available display resolution; and
- generate the display layout based on the available display resolution.

49. The one or more computer-readable storage media as recited in claim 47, further comprising computer-executable instructions that, when executed, configure the computer system to select the descriptors associated with the programs based on a rating.

50. The one or more computer-readable storage media as recited in claim 47, further comprising computer-executable instructions that, when executed, configure the computer system to select the descriptors associated with the programs based on a genre.

51. The one or more computer-readable storage media as recited in claim 47, further comprising computer-executable instructions that, when executed, configure the computer system to select the descriptors associated with the programs based on a viewer identity.

52. The one or more computer-readable storage media as recited in claim 47, further comprising computer-executable instructions that, when executed, configure the computer system to select the descriptors associated with the programs based on previously selected programs.

53. The one or more computer-readable storage media as recited in claim 47, further comprising computer-executable instructions that, when executed, configure the computer system to select the descriptors associated with the programs based on a viewer subscription.

54. One or more computer-readable storage media comprising computer-executable instructions that, when executed, configure a computing system to perform operations comprising:
- generating a display layout that arranges descriptors in a plurality of columns, each column representing an associated date, wherein a first column represents a first date and a second column represents a different second date, the descriptors being associated with programs such that each descriptor is associated with a day and a day part, wherein the day is based on a scheduled broadcast date associated with the descriptor and the day part is based on a scheduled broadcast start time associated with the descriptor, wherein:
  - for each program associated with a descriptor that is displayed, the display layout does not indicate a specific start time of the program, a duration of the program, or a channel over which the program is scheduled to be available;
  - the programs generated for display have a plurality of broadcast dates and are broadcast on a plurality of different programming channels; and
  - for each of a plurality of day parts, a group of descriptors are listed in a non-temporal order and the group is associated with a corresponding one of the plurality of day parts such that each descriptor does not directly correspond to an indicated actual broadcast start time;
- receiving an indication of a selected descriptor; and
- generating a subsequent display of information associated with a program associated with the selected descriptor, wherein the subsequent display of information comprises an actual broadcast start time and a broadcast channel.

55. One or more computer-readable storage media comprising computer-executable instructions that, when executed, configure a computing system to perform operations comprising:
- generating a display layout that arranges descriptors associated with programs such that each descriptor is associated with a day and a day part, wherein the day is based on a scheduled broadcast date associated with the descriptor and the day part is based on a scheduled broadcast start time associated with the descriptor, wherein:
  - the programs displayed have a plurality of broadcast dates and are broadcast on a plurality of different programming channels; and
  - for each of a plurality of day parts corresponding to a particular day, a group of descriptors are listed in a non-temporal order and the group is associated with a corresponding one of the plurality of day parts;

receiving an indication of a selected descriptor; and scheduling a recording device to record a program associated with the selected descriptor.

56. A client device, comprising:

a memory;

a processor; and a media planner application stored in memory and executed via the processor to generate a displayable layout of program descriptors presented via a graphical user interface according to a plurality of day parts arranged in a plurality of rows and a plurality of broadcast days arranged in a plurality of columns that each represent a different associated broadcast day, wherein:

the program descriptors correspond to programs broadcast on a plurality of different channels; and for each of a plurality of days, a group of descriptors are listed in a non-temporal order and the group is associated with a corresponding one of the plurality of day parts.

57. The client device as recited in claim 56, wherein the media planner application further comprises a sorting component that sorts a display order of the program descriptors based on a rank.

58. The client device as recited in claim 56, further comprising:

a program recommendation application stored in memory and executed on the processor to select one or more recommended broadcast programs for which to display an associated program descriptor in the layout of program descriptors.

59. The client device as recited in claim 56, further comprising a digital video recorder application stored in memory and executed on the processor to receive an indication of a selected program descriptor and storing a broadcast program associated with the selected descriptor in memory.

60. The client device as recited in claim 56, wherein the client device is a digital video recorder.

61. A digital video recorder comprising:

a program memory to store broadcast programs;

a processing unit to generate a displayable layout of program descriptors associated with programs scheduled to be broadcast on multiple dates and multiple channels, wherein:

the program descriptors are presented via a graphical user interface according to a plurality of day parts arranged in a plurality of rows and a plurality of broadcast days arranged in a plurality of columns;

for each of the plurality of day parts, a group of program descriptors are listed in a non-temporal order and the group is associated with a corresponding one of the plurality of day parts; and upon user selection of a particular program descriptor, the processing unit stores a broadcast program in the program memory.

62. The digital video recorder as recited in claim 61, wherein the processing unit sorts the program descriptors in the displayable layout based on a rank associated with the program descriptors.

63. The digital video recorder as recited in claim 61, wherein the processing unit selects program descriptors to be arranged in the layout that are associated with recommended broadcast programs.

64. One or more computer-readable storage media storing computer-executable instructions that, when executed via one or more processors, perform the method as recited in claim 1.

65. One or more computer-readable storage media storing computer-executable instructions that, when executed via one or more processors, perform the method as recited in claim 21.

* * * * *